United States Patent [19]

Wix

[11] Patent Number: 5,033,759
[45] Date of Patent: Jul. 23, 1991

[54] ALL-TERRAIN VARIABLE-VOLUME MULTI-ARTICLE UTILITY CARRIER

[76] Inventor: John H. Wix, 16064 County Rd. 8, Meeker, Colo. 81641

[21] Appl. No.: 538,201

[22] Filed: Jun. 14, 1990

Related U.S. Application Data

[63] Continuation-in-part of Ser. No. 320,179, Mar. 6, 1989, abandoned.

[51] Int. Cl.⁵ .................................................. B62B 1/04
[52] U.S. Cl. ..................................... 280/47.18; 280/35; 280/47.19; 280/47.26
[58] Field of Search ............... 280/47.18, 47.19, 47.26, 280/47.35, 47.24, 638, 35, 47.34

[56] References Cited

U.S. PATENT DOCUMENTS

| | | | |
|---|---|---|---|
| 2,542,244 | 2/1951 | Gerhardt et al. | 38/1 |
| 2,885,090 | 5/1959 | Forman et al. | 211/175 |
| 3,162,462 | 12/1964 | Elders | 280/47.35 |
| 3,677,570 | 7/1972 | Hedu | 280/33.99 A |
| 3,827,707 | 8/1974 | Bierman | 280/36 C |
| 3,927,894 | 12/1975 | Zawislak | 280/8 |
| 4,040,644 | 8/1977 | Flagg | 280/659 |
| 4,248,453 | 2/1981 | Stark | 280/655 |
| 4,407,521 | 10/1983 | Zeitlin | 280/655 |
| 4,413,834 | 11/1983 | Base | 280/47.26 |
| 4,441,734 | 4/1984 | Schlissel | 280/638 |
| 4,469,341 | 9/1984 | Creim | 280/47.26 |
| 4,530,510 | 7/1985 | Driggers | 280/47.17 |
| 4,531,752 | 7/1985 | Diener | 280/47.18 |
| 4,550,931 | 11/1985 | Ziaylek, Jr. | 280/655 |
| 4,616,756 | 10/1986 | Holtz | 211/181 |
| 4,836,565 | 6/1989 | Catalo | 280/37 |
| 4,842,289 | 6/1989 | Samuels | 280/8 |
| 4,846,485 | 7/1989 | Payne | 280/47.18 |

FOREIGN PATENT DOCUMENTS 1106287  7/1955  France .............................. 280/47.24

OTHER PUBLICATIONS

Sporty's Preferred Living Catalog, Sep.-Dec. 1988, p. 50.

Primary Examiner—Andres Kashnikow
Assistant Examiner—Eric Culbreth
Attorney, Agent, or Firm—John R. Flanagan

[57] ABSTRACT

A manually-powered multi-article utility carrier has a mobile body defined by separate spaced apart upright front and rear main support structures being rigidly interconnected by a load-supporting bottom platform structure, and separate auxiliary support structures movably interfaced telescopically with the main support structures. The main support structures, bottom platform structure and auxiliary support structures together define the capacity of a variable-volume multi-article holding cavity of the carrier body. Locking mechanisms releasably couple the respective support structures together for locking the auxiliary structures in one of a series of extended longitudinal positions relative to the main structures for varying the volume of the carrier body holding cavity. The carrier body has a generally upright orientation when in a freestanding resting position and can be angularly tilted to assume a transport orientation wherein it rests on a pair of ski-like skids attached thereto. A storage compartment is attached to the carrier body so as to underlie the bottom platform structure, and a pair of ground wheels are rotatably mounted at opposite sides of the compartment.

17 Claims, 5 Drawing Sheets

ALL-TERRAIN VARIABLE-VOLUME MULTI-ARTICLE UTILITY CARRIER

CROSS REFERENCE TO RELATED APPLICATION

This application is a continuation-in-part of copending U.S. Pat. application Ser. No. 320,179, filed Mar. 6, 1989 now abandoned.

BACKGROUND OF THE INVENTION

1. Field of the Invention

The present invention generally relates to transporting articles and, more particularly, is concerned with a manually-powered utility carrier for transporting and storing multiple stacked articles.

2. Description of the Prior Art

In both business and residential environments, articles frequently need to be transported from one location to another. Manually-powered dollies, carts and handtrucks of various constructions have been employed for such purpose. Examples are the hand vehicles disclosed in U.S. Pat. Nos. to Stark (4,248,453), Zeitlin (4,407,521), Base (4,413,834), Creim (4,469,341), Driggers (4,530,510) and Diener (4,531,752) and in *Sporty's Preferred Living Catalog*.

Because of irregular, rounded or otherwise awkward shapes, many articles are not easily stacked on conventional dollies and handtrucks and retained thereon while being transported. Firewood logs are a good example of articles difficult to stack and then transport from the exterior to the interior of a building. The prior art hand vehicles of the Base, Creim, Driggers and Diener patents and Sporty's catalog are apparently constructed to specifically address the problems of stacking and transporting such difficult articles.

These prior art hand vehicles may function reasonably well and generally serve the limited purposes for which they were designed. However, each vehicle appears to embody one or more drawbacks which prevents it from providing an optimum solution to these problems. For instance, the hand vehicles of the Base and Creim patents and Sporty's catalog appear to have constructions offering limited capacity in terms of the amount of logs they will hold. The hand vehicles of the Driggers and Diener patents appear to be overbuilt in terms of the large number of parts, the considerable amount of materials and duplication of functions involved in their respective constructions.

Consequently, it is readily apparent that a need still exists for a manually-powered vehicle which will more effectively address the problems associated with stacking and transporting awkward-shaped articles than has been achieved by the hand vehicles of the prior art.

SUMMARY OF THE INVENTION

The present invention provides a manually-powered utility carrier designed to satisfy the aforementioned needs. The utility carrier of the present invention addresses and resolves the above-described problems and drawbacks by incorporating constructional features which provide a variable volume multiple article holding capacity, an all-terrain mode of mobile support and locomotion, and an overall compact configuration making efficient use of available space.

A first feature of the utility carrier of the present invention which provides the variable volume holding capacity of the carrier relates to a pair of auxiliary support structures interfaced telescopically for longitudinal movement with respect to a pair of rigidly interconnected upright main front and rear support structures for defining the volume of a load-supporting body of the carrier. A second feature of the carrier relates to a locking mechanism associated with the main and auxiliary support structures for locking the auxiliary structures in any one of a series of extended positions relative to the main structures to vary the volume of the carrier body.

A third feature of the carrier which provides substantially all-terrain mode of mobile support and locomotion for the carrier is a pair of wheels mounted at the lower sides of the carrier and a plurality of skid attachments at the front side of the carrier. Depending on climatic and terrain conditions where the carrier is used, the appropriate one of the wheels or skids can be selected to transport the carrier. A fourth feature of the carrier which provides its overall compact configuration and efficient use of space relates to the provision of a paper and kindling box below the bottom platform of floor of the main load-supporting body of the carrier.

A fifth feature of the carrier relates to decorative screen-like panels mounted at the front and back of the carrier between the main front and rear support structures. These panels allow mounting of a custom monogram plate on the panels.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

In the following description, like reference characters designate like or corresponding parts throughout the several views of the drawings. Also in the following description, it is to be understood that such terms as "front", "rear", "left", "right", "upward", "downward", and the like are words of convenience and are not to be construed as limiting terms.

Referring now to the drawings, and particularly to FIGS. 1-4, there is shown a manually-powered multi-article utility carrier, generally designated by the numeral 10 and being constructed in accordance with the principles of the present invention. In its basic components, the utility carrier 10 includes a load-supporting carrier body 12 defined by a pair of upright front and rear main support masts or structures 14, 16 and a bottom platform structure 18. A pair of separate front and rear auxiliary support masts or structures 20, 22 are associated with the front and rear main support structures 14, 16. The carrier body 12 also includes a storage compartment 24, such as for kindling wood and papers, located below the bottom platform structure 18. The carrier body 12 is supported and made mobile by a pair of laterally spaced ground-engaging wheels 26 rotatably attached to opposite sides of the storage compartment 24. Also, locking mechanisms 28 are provided for maintaining the front and rear auxiliary support structures 20, 22 in desired positions relative to the front and rear main support structures 14, 16.

Figure 1:
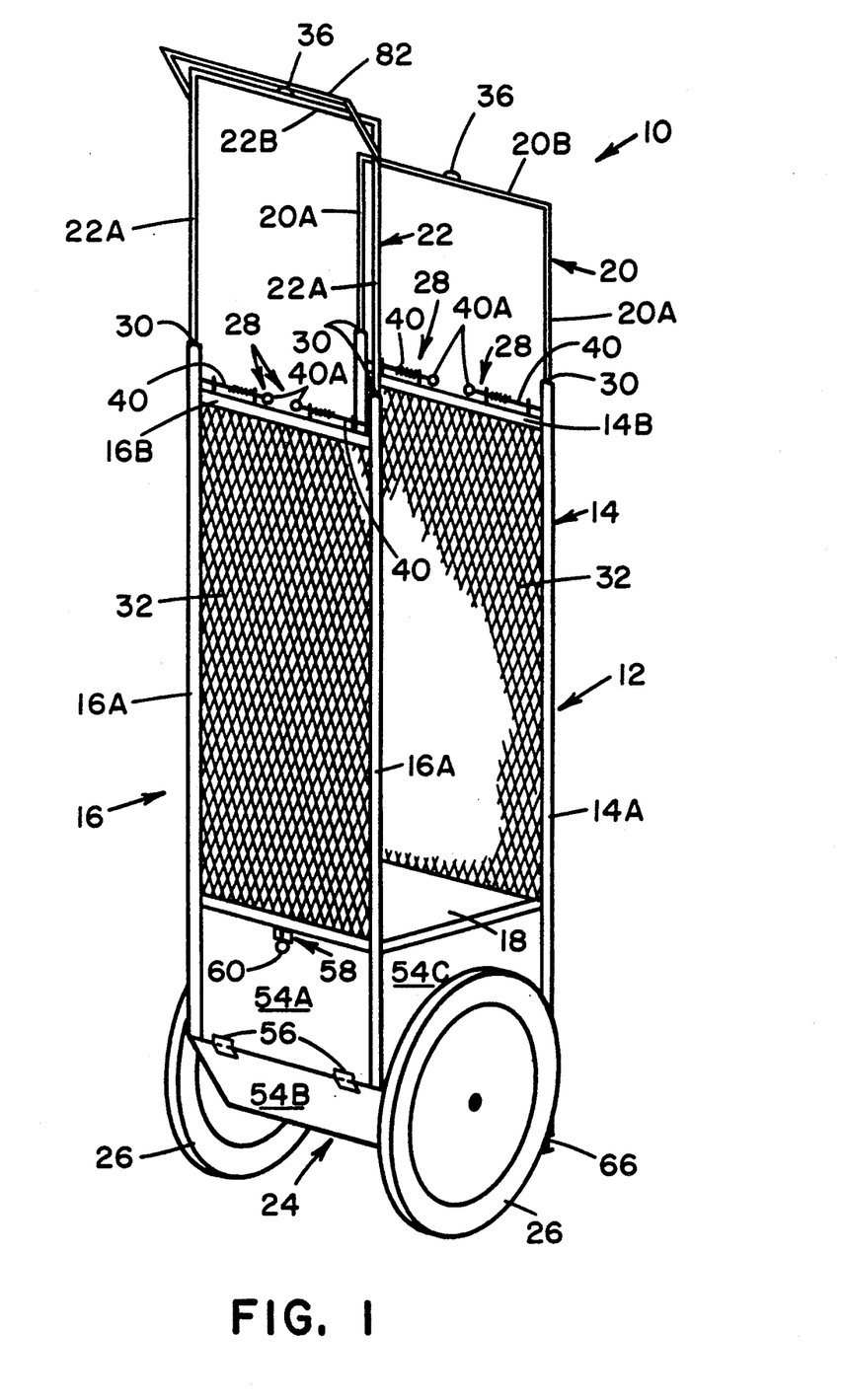
FIG. 1 is a rear and side perspective view of the utility carrier of the present invention.
Figure 2:
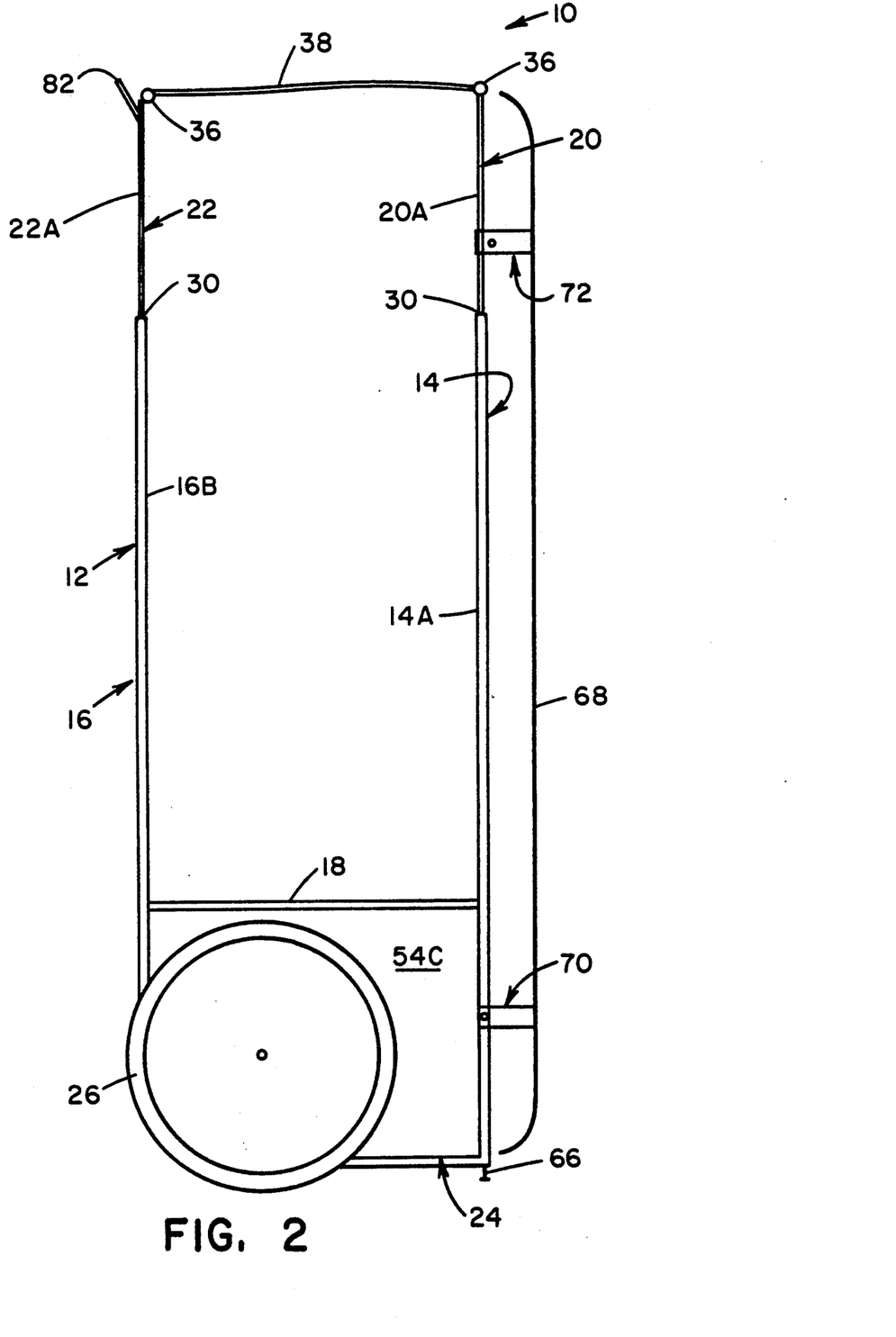
FIG. 2 is an enlarged side elevational view of the utility carrier of FIG. 1, illustrating ski-like skids mounted on the carrier for transporting the same.

More particularly, the load-supporting carrier body 12 of the utility carrier 10 of the present invention is configured to assume or be placed in a freestanding resting position in which it has a generally overall upright orientation, as best seen in FIGS. 1 and 2. The bottom platform structure 18 extends generally horizontally when the carrier body 12 is in its upright orientation. The front and rear main support structures 14, 16 are rigidly connected to and extend upright from the bottom platform structure 18 at respective front and rear edges thereof such that the upright front and rear main support structures 14, 16 are separate and spaced from one another by the opposite side edges of the bottom platform structure 18. Further, the main support structures 14, 16 extend generally parallel to one another, are generally equal in height, and have the same configurations.

The separate front and rear auxiliary support structures 20, 22 of the utility carrier 10 respectively interface telescopically with the front and rear main support structures 14, 16 for longitudinal movement relative thereto. The main and auxiliary support structures 14, 16 and 20, 22 together with the bottom platform structure 18 define the overall capacity of a multi-article holding cavity of the carrier body 12 which is open and unobstructed above the opposite side edges of the bottom platform structure 18. The carrier body 12 is adapted to hold a variety of types of articles, one type being firewood logs, which can extend laterally beyond the side edges of the bottom platform structure 18 and the main and auxiliary support structures 14, 16 and 20, 22.

As shown in FIGS. 1-4, each front and rear main support structure 14, 16 of the utility carrier body 12 is composed of a pair of laterally spaced generally parallel hollow main tubular side members 14A, 16A and a main top cross member 14B, 16B extending between and rigidly interconnecting the main side members 14A, 16A proximate upper ends thereof. The main tubular side members 14A, 16A are rigidly connected to the bottom platform structure 18 at spaced corners defined by the rear, front and opposite side edges thereof.

Figure 3:
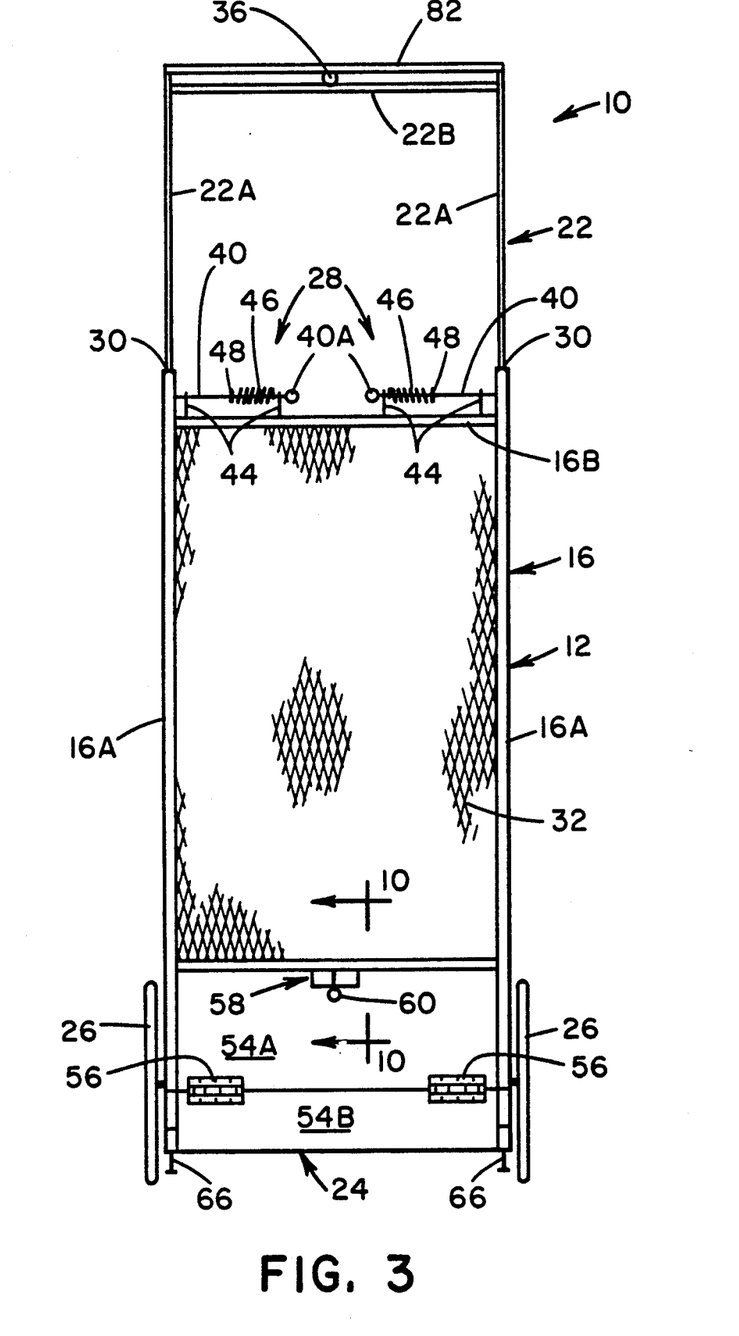
FIG. 3 is a rear elevational view of the utility carrier of FIG. 1.
Figures 4, 9, 10:
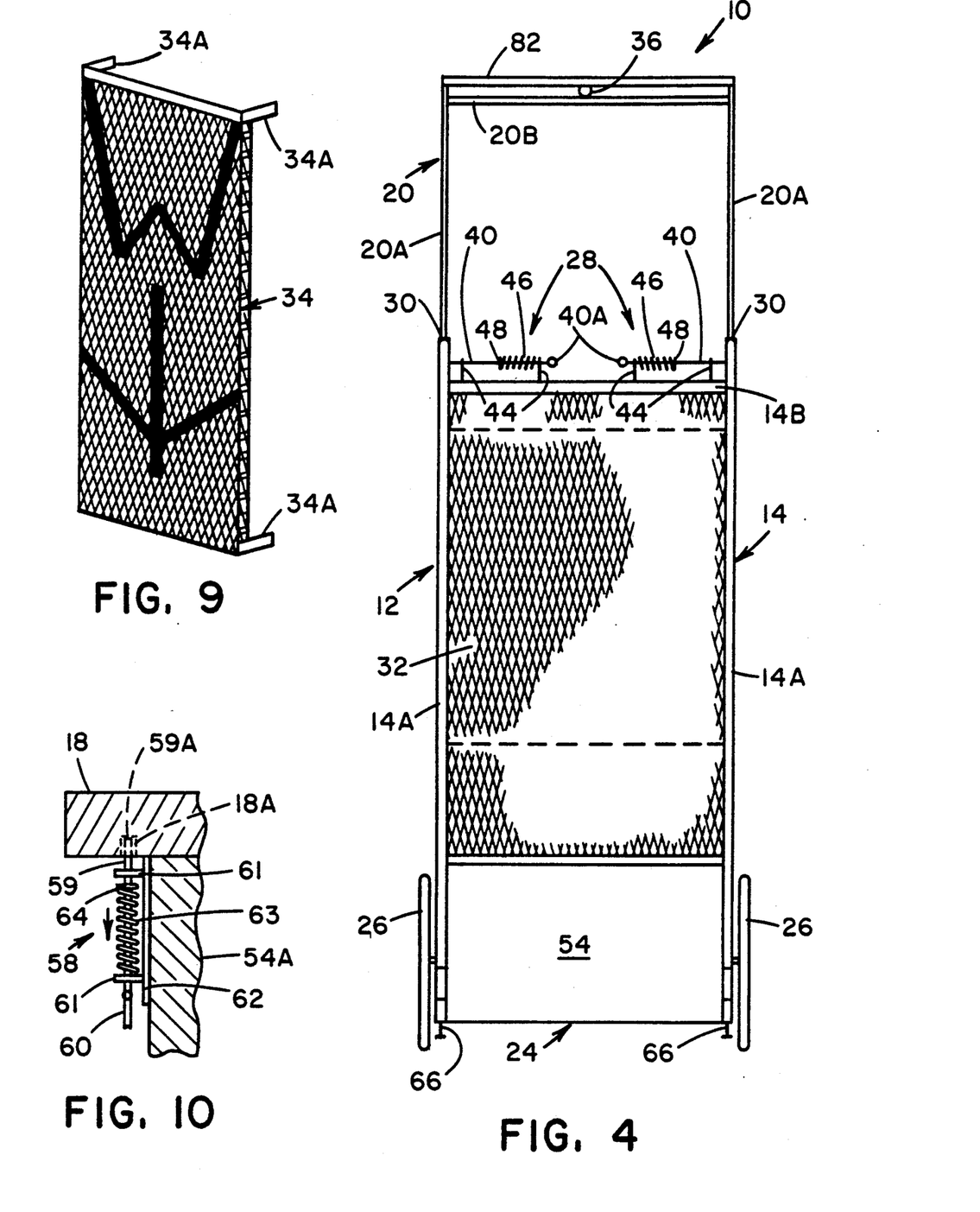
FIG. 4 is a front elevational view of the utility carrier of FIG. 1.
FIG. 9 is a perspective view of a custom monogram plate for attachment to the carrier of FIG. 1.
FIG. 10 is an enlarged fragmentary elevational view as seen along line 10—10 of FIG. 3, illustrating a door latching mechanism.

As best seen in FIG. 4, the upper ends of the main tubular side members 14A, 16A are open at 30. Also, as seen in FIGS. 1, 3 and 4, the front and rear main support structures 14, 16 have respective decorative screen-like panels 32, such as in the form of expanded metal screens, extending between and rigidly attached to the facing sides of the main tubular side members 14A, 16A of the respective front and rear main support structures 14, 16. The purpose of the panels 32 is to improve the overall appearance of the utility carrier 10 from the front and rear and provide lateral support for short logs. Further, the panels 32 provide means by which a decorative custom monogram plate 34, such as shown in FIG. 9, can be attached to the utility carrier 10 since the carrier not only will be used at a residence for transporting firewood logs from an exterior log pile into the interior of the dwelling, but also will be used as a decorative storage rack for storing logs next to the fireplace. Monogram plate 34 has attachment structure in the form of a plurality of bendable corner tabs 34A which when mounted to one of the screen-like panels 32 extend through spaces in the one panel 32 and then are bent ninety-degrees for retaining the plate 34 to the one panel.

Each of the front and rear auxiliary support structures 20, 22 is composed of a pair of generally parallel hollow auxiliary tubular side members 20A, 22A and an auxiliary top cross member 20B, 22B extending between and rigidly interconnecting the auxiliary side members 20A, 22A proximate their upper ends. The auxiliary side members 20A, 22A are inserted at their respective lower ends through the open top ends of the main side members 14A, 16A for mounting the auxiliary side members in 20A, 22A in sliding telescopic relation with the respective main side members 14A, 16A for longitudinal movement therein.

Also, each of the auxiliary top cross members 20B, 22B has at a central location a rigid attachment element 36 in the form of a loop fixed thereon. The looped attachment elements 36 can be used for attaching a flexible strap-like member 38 thereto, such as a bungy cord, a belt, a strap or the like, and routing the same between the top cross member 20B, 22B of the auxiliary support structures 20, 22 and over the load of articles, such as the logs, stacked in the carrier body 12. By such an arrangement, the load is secured not only front, back and bottom but also at the top to restrain articles from falling off the load.

The pair of front main and auxiliary support structures 14, 20 and the pair of rear main and auxiliary support structures 16, 22 of the utility carrier 10 are coupled together for locking and holding the respective auxiliary structures 20, 22 independently of one another in any one of a series of extended positions relative to the respective main support structures 14, 16 for varying the height and thus the holding capacity volume of the carrier body 12 between minimum and maximum limits. When the utility carrier 10 is used as a storage rack next to the fireplace, the use of the respective auxiliary support structures 20, 22 and the locking mechanisms 28 allow the user to periodically lower the auxiliary support structures 20, 22 and thereby reduce the overall height of the carrier 10 down to the height of the main support structures 14, 16 as the height of the stack of logs on the carrier is reduced. This capability together with the presence of the decorative panels 32 should reduce the unattractiveness to many users of a partially empty carrier next to the fireplace.

Figure 5:
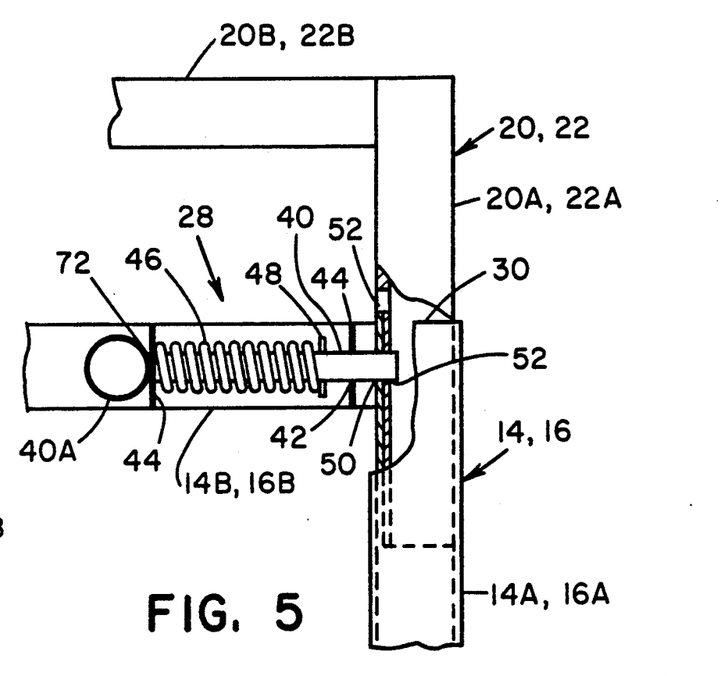
FIG. 5 is an enlarged fragmentary view of the utility carrier of FIG. 3, illustrating the locking mechanism incorporated by the carrier.

In FIGS. 1 and 3-5, there is shown the pairs of locking mechanisms 28 provided for this purpose on the front and rear main support structures 14, 16. The locking mechanisms 28 are all identical in construction and operation. As best seen in FIG. 5, each locking mechanism 28 includes an elongated lock plunger 40 mounted through aligned holes 42 in a pair of spaced brackets 44 rigidly mounted to the top member 14B, 16B of the front and rear main support structures 14, 16 for linear movement between outer locking and inner unlocking positions relative to the respective auxiliary support structure 20, 22 interfaced with the main support structure 14, 16. A coiled spring 46 is disposed about the plunger 40 and captured between the inner one of the brackets 44 and a stop element 48 attached to the plunger 40 adjacent to the outer one of the brackets 44 and extending outwardly from the plunger. Each plunger 40 has a ring 40A attached to its inner end by which the plunger 40 can be pulled against the biasing force of the spring 46 from its outer locking to inner unlocking position. Release of the ring 40A allows the spring 46 to move the plunger 40 back toward its outer locking position.

Each locking mechanism 28 also includes holes 50 defined through the inside faces of the main side members 14A, 16A and a series of longitudinally spaced holes 52 defined through the auxiliary side members 20A, 22A each of which are alignable with the holes 50 through the main side members 14A, 16A and the outer end of the plunger 40 by longitudinal movement of the auxiliary side members 20A, 22A along the main side members 14A, 16A. When the plunger 40 is at the locking position its outer end extends through the aligned ones of the holes 50, 52, retaining the auxiliary support structure 20, 22 in a fixed position relative to the main support structure 14, 16. When the plunger 40 is at the unlocking position its outer end is withdrawn from the aligned holes 50, 52, permitting the auxiliary support structure 20, 22 to be longitudinally moved relative to the main support structure 14, 16.

As mentioned earlier, the compartment 24 of the utility carrier 10 for storage of kindling wood and papers is attached to the carrier body 12 so as to underlie its bottom platform structure 18, while the ground-engaging wheels 26 are rotatably mounted at opposite sides of the compartment 24. The arrangement of the storage compartment 24 and wheels 26 fosters compactness and efficient use of available space.

More particularly, referring again to FIGS. 1-4, the storage compartment 24 of the utility carrier 10 is a closed enclosure defined by a plurality of solid walls 54 interconnecting one another by extending between and connecting with the side members 14A, 16A of the main support structure 14, 16 and the bottom platform structure 18. A rear one of the walls 54A is pivotally connected by spaced hinges 56 to a lower rear one of the walls 54B so as to define an openable and closable door for the storage compartment 24.

As seen in FIGS. 1, 3 and 10, a latch mechanism 58 is mounted on top edge of the rear wall door 54A for normally retaining the door latched in a closed condition. The latch mechanism 58 has a pull ring 60 being actuatable for permitting the door 54A to be moved to an opened condition. The latch mechanism 58 is composed of an elongated latch plunger 59 mounted through spaced tabs 61 fixed on and projecting from a plate 62 mounted on the door 54A. A coiled spring 63 is disposed about the plunger 59 and captured between the lower one of the tabs 61 and a stop element 64 attached to the plunger 59. Pulling downwardly on the ring 60 unlatches the plunger 59. Releasing of the ring 60 allows relatching of the plunger 59. When the plunger 59 is relatched, a tip 59A of the plunger 59 extends into a hole 18A in the bottom platform 18.

The pair of ground-engaging wheels 26 of the utility carrier 10 are rotatably mounted by bearings (not shown) to walls 54C located at the opposite sides of the carrier body 12 and compartment 24. Also, the utility carrier 10 includes a pair of spaced apart adjustable leveling feet 66 attached to lower ends of side members 14A of the front main support structure 14 of the carrier body 12 and spaced forwardly of the wheels 26. The leveling feet 66 can be adjusted to level the carrier body 12 in its stationary upright orientation.

Figure 8:
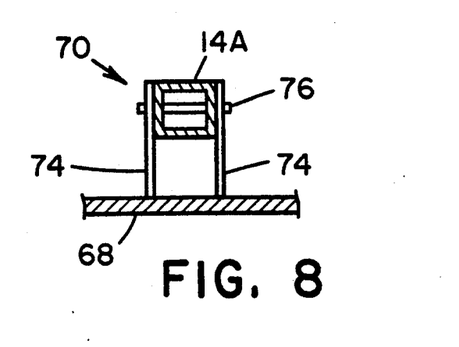
FIG. 8 is an enlarged cross-sectional view taken along line 8—8 of FIG. 6.

Normally, the load-supporting carrier body 12 is transported by its ground wheels 26 under most terrain and climatic conditions. However, for use in snow terrain and climatic conditions, the carrier body 12 can be tilted forwardly to assume a generally horizontal transport orientation wherein it rests on a pair of skilike skids 68 attached thereto. As seen in FIGS. 2 and 6-8, pairs of first and second attachment elements 70, 72 are provided on the skids 68 and the side members 14A of the front main support structure 14 for mounting the skids to the front main support structure 14. The first attachment elements 70 include pairs of spaced tabs 74 on the skids 68 and fastening bolts 76 which extend through aligned holes in the tabs 74 and side members 14A to connect the tabs thereto, as best seen in FIG. 8. Thus, the first attachment elements 70 interconnect the lower end portions of the skids 68 to the front main support structure 14 so as to prevent relative movement between them.

Figure 6:
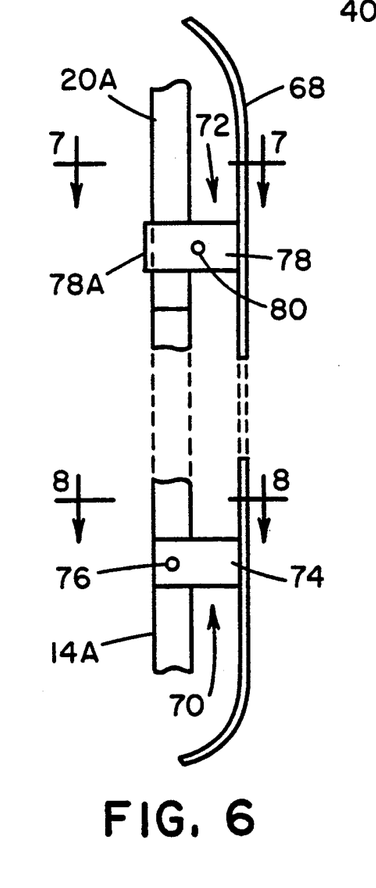
FIG. 6 is an enlarged fragmentary view of the utility carrier of FIG. 2, illustrating the structure mounting the skids to the carrier.
Figure 7:
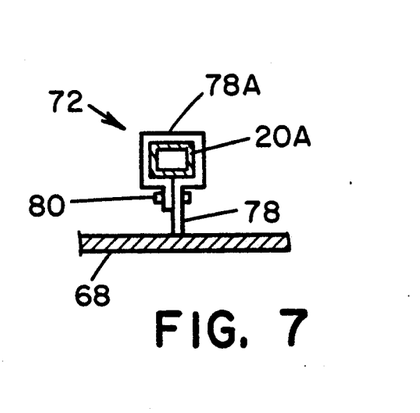
FIG. 7 is an enlarged cross-sectional view taken along line 7—7 of FIG. 6.

The second attachment elements 72 include tabs 78 having rectangular couplers 78A formed on their outer ends which slidably receive therethrough the side members 20A of the front auxiliary support structures 20. Fasteners 80 are provided for clamping and unclamping the couplers 78A about the side members 20A. Thus, the second attachment elements 72 interconnect the upper ends portions of the skids 68 to the front auxiliary support structure 20 being telescopically interfaced with the front main support structure 14 so as to permit relative movement therebetween and thereby allow for telescopic movement of the front auxilary support structure 20 relative to the front main support structure 14 so that the height of the carrier body 12 can be adjusted without detachment of the skids 68.

Finally, the utility carrier 10 has a handle 82 for facilitating tilting the carrier 10 away from its overall upright orientation when it is desired to move it. The handle 82 is preferably attached to the auxiliary cross member 22B of the rear auxiliary support structure 22 which interfaces with the rear main support structure 16.

It is thought that the utility carrier of the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

Having thus described the invention, what is claimed is:

1. A multi-article utility carrier, comprising:
   (a) a carrier body including a load-supporting bottom platform structure and a pair of front and rear main support structures, said bottom platform having front and rear edges and opposite side edges extending between and interconnecting said front and rear edges and defining a plurality of corners on said bottom platform structure, said front and rear main support structures being rigidly connected to and extending upright from said bottom platform structure at said respective front and rear edges thereof such that said upright front and rear main support structures are separate and spaced from one another by said opposite side edges of said bottom platform structure, each of said front and rear main support structures including a pair of generally parallel hollow main tubular members being open at their upper ends and disposed at said respective corners of said bottom platform structure;

(b) a storage compartment attached to said carrier body and underlying said bottom platform structure thereof, said storage compartment being an enclosure defined by a plurality of walls interconnected to one another and to said bottom platform structure and said main tubular members of said front and rear main support structures of said carrier body;

(c) a pair of ground-engaging wheels rotatably mounted to the exterior of a pair of said walls of said storage compartment located at opposite sides of said carrier body and said compartment;

(d) a pair of separate auxiliary support structures, each of said auxiliary support structures including a pair of generally hollow auxiliary tubular members having lower ends fitted within said open upper ends of said main tubular members and thereby mounting said auxiliary tubular members of each of said auxiliary support structures in sliding telescopic relation with said respective main tubular members of each of said respective main support structures for longitudinal movement therein, said separate auxiliary support structures together with said main support structures defining the capacity of an multi-article holding cavity of said body which is open and unobstructed above said opposite side edges of said bottom platform structure; and (e) means coupled with said main and auxiliary support structures for locking said auxiliary structures in any one of a series of extended longitudinal positions relative to said main structures for varying the capacity of said holding cavity of said body.

2. The utility carrier as recited in claim 1, wherein at least said front one of said main support structures includes a screen-like panel extending between and attached to said parallel tubular members of said structure.

3. The utility carrier as recited in claim 2, further comprising a monogram plate attachable to said screen-like panel.

4. The utility carrier as recited in claim 1, further comprising a handle attached to the one of said auxiliary support structures which is mounted to said rear main support structure.

5. The utility carrier as recited in claim 1, wherein each of said main support structures also includes a main cross member extending between and rigidly interconnecting said parallel main members proximate upper ends thereof.

6. The utility carrier as recited in claim 1, wherein each of said auxiliary support members also includes an auxiliary cross member extending between and rigidly interconnecting said parallel auxiliary members proximate upper ends thereof.

7. The utility carrier as recited in claim 6, wherein each of said auxiliary cross members of each auxiliary support structure includes at least one attachment element fixed thereon for attaching a flexible strap-like member thereto and routing the strap-like member between said auxiliary support structures and over a load of articles stacked in said carrier body.

8. The utility carrier as recited in claim 1, wherein said locking means is in the form of pairs of separate lock mechanisms each of which includes:
an elongated lock plunger mounted to a respective main support structure for generally linear movement between locking and unlocking positions relative to a respective auxiliary support structure slidably mounted within said main support structure; and
means engaged with said lock plunger and said respective main support structure for biasing said lock plunger to its respective locking positions.

9. The utility carrier as recited in claim 1, wherein said walls of said storage compartment are solid walls.

10. The utility carrier as recited in claim 1, wherein storage compartment includes:
an openable and closable door defined by one of said walls of said storage compartment being movably mounted relative to another wall thereof; and
a latch mechanism mounted to said storage compartment and said movable wall defining said door and being operable for normally retaining said door in a closed condition and being actuatable for permitting said door to be moved to an opened condition.

11. The utility carrier as recited in claim 1, further comprising a pair of spaced apart leveling feet attached to a lower end of said carrier body and spaced from said wheels.

12. The utility carrier as recited in claim 1, further comprising a pair of ski-like skids attachable to said carrier body for supporting said body in a transport orientation in which it is disposed upon said skids and angularly tilted from its generally upright orientation.

13. A multi-article utility carrier, comprising:
(a) a mobile load-supporting carrier body including a pair of upright front and rear main support structures being rigidly interconnected and spaced apart;
(b) a pair of separate auxiliary support structures interfaced telescopically with said main support structures for longitudinal movement relative thereto and which together with said main support structures define the capacity of a multi-article holding cavity of said body;
(c) means coupled with said main and auxiliary support structures for locking said auxiliary structures in any one of a series of extended longitudinal positions relative to said main structures for varying the holding capacity of said body;
(d) a pair of ski-like skids attachable to said load-supporting carrier body for supporting said body in a transport orientation in which it is disposed upon said skids and angularly tilted from its generally upright orientation;
(e) a pair of first attachment elements for interconnecting one end portions of said skids and one of said main support structures so as to prevent relative movement therebetween; and (f) a pair of second attachment elements for interconnecting opposite end portions of said skids and the one of s aid auxiliary support structures telescopically interfaced with said one main support structure so as to permit relative movement therebetween and thereby allow for telescopic movement of said one auxiliary support structure relative to said one main support structure.

14. The utility carrier as recited in claim 13, wherein each of said main support structures includes:
   a pair of generally parallel hollow main tubular members; and
   a main cross member extending between and rigidly interconnecting said parallel main members proximate upper ends thereof.

15. The utility carrier as recited in claim 14, wherein said pair of first attachment elements are connected to said main tubular members of one of said main support structures.

16. The utility carrier as recited in claim 14, wherein each of said auxiliary support members includes:
   a pair of generally parallel hollow auxiliary tubular members; and
   an auxiliary cross member extending between and rigidly interconnecting said parallel auxiliary members proximate upper ends thereof, said upper ends of said main tubular members being open adapting them to receive therethrough said auxiliary tubular member at lower ends thereof for mounting said auxiliary members in sliding telescopic relation within said main members.

17. The utility carrier as recited in claim 16, wherein said pair of second attachment elements are connected to said auxiliary tubular members of one of said auxiliary support structures so as to permit relative movement between said pair of second attachment elements and said auxiliary tubular members and thereby allow for sliding telescopic movement of said one auxilary support structure relative to said one main support structure.

* * * * *